Feb. 27, 1923.
G. A. SAGER
1,446,813
METHOD OF INSTALLING SAFETY BOILER PLUGS
Original Filed Aug. 19, 1920
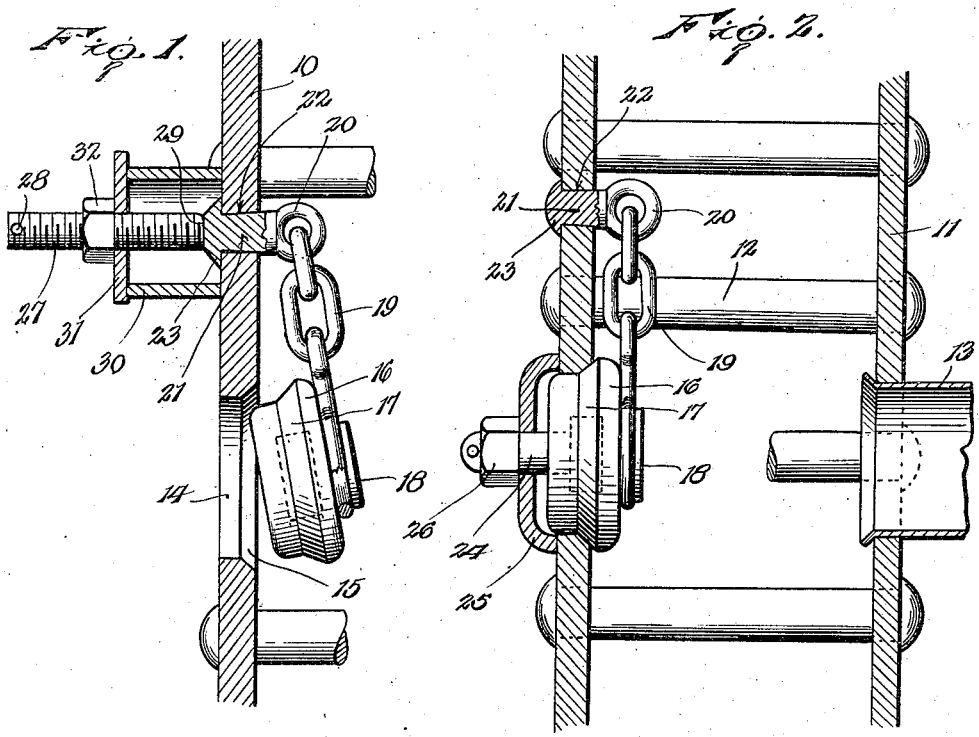
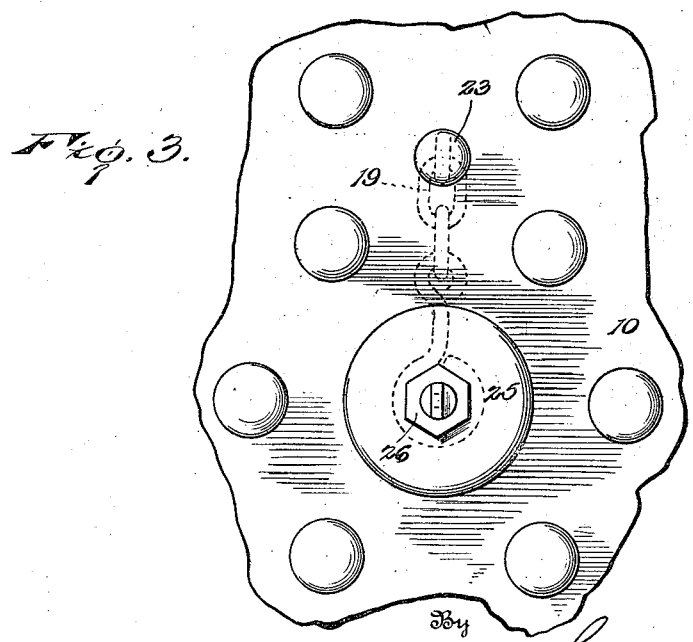
Inventor
G. A. Sager.
By
Lacey & Lacey, Attorneys Patented Feb. 27, 1923.

1,446,813

UNITED STATES PATENT OFFICE.

GEORGE A. SAGER, OF ALBANY, NEW YORK.

METHOD OF INSTALLING SAFETY BOILER PLUGS.

Original application filed August 19, 1920, Serial No. 404,659. Divided and this application filed December 13, 1921. Serial No. 522,129.

*To all whom it may concern:*

Be it known that I, GEORGE A. SAGER, citizen of the United States, residing at Albany, in the county of Albany and State of New York, have invented certain new and useful Improvements in Methods of Installing Safety Boiler Plugs, of which the following is a specification.

This invention relates to an improved method of installing safety boiler plugs, being a division of my pending application for safety boiler plug and method of installing same, filed August 19, 1920, Serial No. 404,659.

In my pending application, I disclose a plug which is arranged to project through a boiler sheet from the inner side thereof so that the plug cannot blow out, and the present invention comprehends a novel method of installing and anchoring the plug.

Other and incidental objects will appear hereinafter.

In the drawing:

Figure 1 is a sectional view showing the manner in which the anchoring bolt for the plug is applied.

Figure 2 is a sectional view showing the finished anchoring bolt, and

Figure 3 is a fragmentary front elevation looking at the bolt and plug.

Referring now more particularly to the drawing, I have illustrated the backhead of a locomotive boiler at 10 and the back sheet at 11. The usual stud bolts are indicated at 12 and entering through the back sheet is an arch tube 13. Formed in the backhead opposite the arch tube is an opening 14 provided at its inner end with a beveled seat 15 and formed to removably fit in said seat is a plug 16 having a beveled face 17 to rest lightly against the seat 15. Rising from the plug at its inner end is a headed stud 18 and anchoring the plug to the backhead is a short length of chain 19. The lowermost link of this chain is provided with a split loop engaging around the stud 18 to provide a swivel connection between the chain and plug while the uppermost link of the chain is engaged through the eye of an eye bolt 20. This eye bolt is formed with a longitudinally tapered shank 21 which projects outwardly through a reversely tapered opening 22 in the back head 10 snugly fitting said opening, and securing the eye bolt to the back head is a weld 23 forming a head at the outer end of the shank coacting with the back head. As particularly shown in Figure 3 of the drawing, the eye bolt is preferably arranged directly above the plug while the chain 19 is of such length that, when the plug is displaced from the opening 14 in the back head, the plug will be supported at the inner side of the back head opposite said opening so that the plug may be readily reached. Normally securing the plug in position closing the opening 14 is a clamping bolt 24 detachably engaged at its inner end with the plug and surrounding the bolt to rest against the back head in a cupped washer 25. Threaded upon the bolt to coact with this washer is a nut 26 which may be adjusted for tightly clamping the plug within the opening 14, the washer being flexed to frictionally coact with the nut for locking the nut against accidental displacement.

Referring now particularly to Figure 1, it will be seen that the shank 21 of the eye bolt 20 is originally formed with a threaded portion 27 provided near its outer end with an opening 28 and connected with the tapered inner end portion of the shank by a reduced neck 29. A collar or spacer 30 is provided as is also a washer 31 adapted to rest against the collar, while a nut 32 is threaded upon the outer end portion of the shank to coact with the washer.

In installing the device, the eye bolt having the chain and plug attached thereto is lowered within the water space of the boiler at the rear of the back head until the eye bolt appears at the opening 14. A workman then seizes the eye bolt when a length of wire is engaged through the opening 28 thereof and the free end of the wire directed outwardly through the eye bolt opening in the back head. By then pulling upon the wire, the shank of the eye bolt may be drawn through said opening, the bolt shank being preferably provided at its outer end with an arrow or other mark denoting the disposition of the eye at the inner end of the bolt so that the bolt may be rotated and the eye readily disposed vertically. The spacer 30 is then arranged about the shank of the eye bolt and the washer positioned against said spacer when the nut 32 is applied to the threaded portion 27 of said shank and adjusted inwardly thereon for forcibly drawing the tapered portion of the eye bolt shank outwardly through the opening in binding engagement with the wall thereof to form a closed joint between the eye bolt and the back head. The nut, washer and spacer are then removed when the weld 23 is formed. This done, the threaded portion 31 of the shank of the eye bolt is broken off at the neck 29. The eye bolt will then support the plug suspended opposite the opening 14 through the back head so that the clamping bolt 24 may be readily engaged with the plug for securing the plug in place.

Having thus described the invention, what is claimed as new is:

1. The method of installing a plug upon a boiler sheet which consists in fitting an attached anchoring bolt for the plug through the sheet from the inner side thereof, drawing the bolt outwardly into wedging engagement with the sheet, and securing the bolt against inward retraction through the sheet.

2. The method of installing a plug upon a boiler sheet which consists in fitting an attached anchoring bolt for the plug through a tapered opening in the sheet from the inner side of said sheet, drawing the bolt outwardly into wedging engagement with the sheet, and securing the bolt against inward retraction through the sheet.

3. The method of installing a plug upon a boiler sheet which consists in forming an opening through the sheet, fitting an anchoring bolt having the plug attached thereto through said opening from the inner side of the sheet, adjusting a nut upon the projecting outer end portion of the bolt for forcibly drawing the bolt through said opening, forming a head upon the bolt at the outer side of the sheet, and breaking off the outer end portion of the bolt near the head formed thereon.

4. The method of installing a plug upon a boiler sheet which consists in forming an opening through the sheet, fitting an attached anchoring bolt for the plug through said opening from the inner side of the sheet, disposing a spacer about the outer end portion of the bolt, arranging a washer upon the bolt to coact with said spacer, adjusting a nut upon the outer end portion of the bolt to coact with said washer for forcibly drawing the bolt through said opening, welding a head upon the bolt at the outer side of the sheet, and breaking the outer end portion of the bolt off near the head welded thereon.

In testimony whereof I affix my signature.

GEORGE A. SAGER. [L. S.]